US011210560B2

(12) United States Patent
van Baar

(10) Patent No.: US 11,210,560 B2
(45) Date of Patent: Dec. 28, 2021

(54) MULTI-MODAL DENSE CORRESPONDENCE IMAGING SYSTEM

(71) Applicant: Mitsubishi Electric Research Laboratories, Inc., Cambridge, MA (US)

(72) Inventor: Jeroen van Baar, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 120 days.

(21) Appl. No.: 16/591,381

(22) Filed: Oct. 2, 2019

(65) Prior Publication Data

US 2021/0103770 A1    Apr. 8, 2021

(51) Int. Cl.
*G06K 9/00* (2006.01)
*G06K 9/62* (2006.01)

(52) U.S. Cl.
CPC ....... *G06K 9/6256* (2013.01); *G06K 9/00362* (2013.01); *G06K 9/6232* (2013.01)

(58) Field of Classification Search
CPC .. G06K 9/6232; G06K 9/9256; G06K 9/6256; G06K 9/00362; G06K 9/00369; G06K 9/629; G06T 7/00
USPC ................................................. 382/155–161
See application file for complete search history.

(56) References Cited

U.S. PATENT DOCUMENTS

| 2014/0313362 | A1* | 10/2014 | Heringslack | G06F 40/166 348/222.1 |
| 2016/0093050 | A1* | 3/2016 | Kim | G06K 9/46 382/128 |
| 2017/0014203 | A1* | 1/2017 | De Mathelin | A61B 5/066 |
| 2017/0032222 | A1* | 2/2017 | Sharma | G06K 9/4619 |
| 2018/0107897 | A1* | 4/2018 | Zheng | G11B 27/031 |

(Continued)

OTHER PUBLICATIONS

Schneider, N., Piewak, F., Stiller, C., & Franke, U. (2017). RegNet: Multimodal sensor registration using deep neural networks. 2017 IEEE Intelligent Vehicles Symposium (IV), 1803-1810. (Year: 2017).*

(Continued)

*Primary Examiner* — Andrew M Moyer
(74) *Attorney, Agent, or Firm* — Gennadiy Vinokur; Hironori Tsukamoto

(57) ABSTRACT

A multi-modal dense correspondence image processing system submit the multi-modal images to a neural network to produce multi-modal features for each pixel of each of the multi-modal image. Each multi-modal image includes an image of a first modality and a corresponding image of a second modality different from the first modality. The neural network includes a first subnetwork trained to extract first features from pixels of the first modality, a second subnetwork trained to extract second features from pixels of the second modality, and a combiner configured to combine the first features and the second features to produce multi-modal features of a multi-modal image. The system compares the multi-modal features of a pair of multi-modal images to estimate a dense correspondence between pixels of the multi-modal images of the pair and outputs the dense correspondence between pixels of the multi-modal images in the pair.

18 Claims, 13 Drawing Sheets

(56) References Cited

U.S. PATENT DOCUMENTS

2018/0285689 A1* 10/2018 Mei .................. G06K 9/6256
2020/0160542 A1* 5/2020 Kanzawa .............. G06T 7/11

OTHER PUBLICATIONS

Qiao, Y., Gao, L., Lai, Y., Zhang, F., Yuan, M., & Xia, S. (2018). SF-Net: Learning Scene Flow from RGB-D Images with CNNs. BMVC. (Year: 2018).*

* cited by examiner

MULTI-MODAL DENSE CORRESPONDENCE IMAGING SYSTEM

TECHNICAL FIELD

This invention relates generally to image processing and more particularly to estimating dense correspondences of pixels in a pair of digital images of a motion sequence.

BACKGROUND

Establishing correspondences between images is a long-standing problem with a multitude of applications in computer vision and graphics, ranging from classical tasks like motion analysis, tracking and stereo, through 3D reconstruction, objection detection and retrieval, to image enhancement and editing. Most correspondence methods are limited in handling a variety of different scenarios. For example, in one scenario, the images are close to each other in time and in viewpoint. In another scenario, the difference in viewpoint of the images may be large, but the scene consists of mostly rigid objects. In yet another scenario, the input images share some common content, but differ significantly due to a variety of factors, such as non-rigid changes in the scene, changes in lighting and/or tone mapping, and different cameras and lenses. The latter scenario is common in personal photo albums, which typically contain the same subjects photographed under different conditions. Current methods struggle to handle one or more of these types of scenarios.

An example of generic scenario for dense correspondence imaging system is an estimation of dense correspondences between human characters in walking motion in consecutive images of a motion sequence defining per-pixel correspondences between human poses in the consecutive images. Considering that humans are non-rigid objects, such a scenario of a dense correspondence that determines for each pixel on the surface of a human character in an image, the corresponding pixel on the surface of a human character in a next image, poses a number of challenges.

Current solutions to this dense correspondence problem that give the highest accuracy are learning based approaches, e.g., approaches that use (a) trained neural network(s) for dense correspondence estimation. However, training (a) suitable neural network(s) is a challenging problem and accuracy of even currently most accurate solutions tends to decrease towards the extremities of the human characters, i.e. the arms and hands, and legs and feet.

Accordingly, there is a need for a system and a method for estimating dense correspondences of pixels in consecutive digital images of a motion sequence.

SUMMARY

It is an object of some embodiments to extend learning based dense correspondence techniques to multi-modal images of the same scene. For example, it is an object of one embodiment to provide a multi-modal imaging system that establishes dense correspondence in consecutive digital images of a motion sequence. Examples of such a motion sequence include digital multi-modal images including a sequence of depth images and a corresponding sequence of color images. Some embodiments are based on understanding that multi-modal images can complement each other with different modal specific information leading to an increase of the accuracy of dense correspondence.

However, to provide a multi-modal learning base dense correspondence system, the underlying neural network(s) need to be trained on images of different modalities. In the context of dense correspondence, such a training is challenging due to different appearance of images of different modalities resulting in different correspondence of different pixels in different modalities. For example, one method to train a neural network for dense correspondence is a classification approach that trains neural network using a principle that similar pixels need to be classified into the same region. In that classification approach, neural network and classifier are trained together based on individual images, i.e., each input image is used to train the neural network and the classifier independently from any other input image. However, this classification approach is not extendable to multi-modal dense correspondence due to differences in appearance and, thus, classification, of images of different modalities, e.g., depth and color images.

Some embodiments are based on recognition that classification-based training on individual images is misaligned with nature of estimating dense correspondences in consecutive images. Because the objective of dense correspondence is to capture motion (and deformation, induced by motion), there is a need to define a training metric (loss function) for training NN based on corresponding pixels of consecutive images capturing the motion (and deformation).

Some embodiments identify different metrics that capture motion in consecutive images. For example, in some embodiments, the first metric is based on embedding loss, while the second metric is based on optical flow. The embedding loss metric is based on the assumption that because the corresponding pixels of consecutive images capturing the motion belong to the same point, there is an embedded space where values of those pixels are the same even when they have different values in original space. Hence, the embedding loss metric can be used to train a neural network that produces similar feature vectors for corresponding pixels of the same point even if these corresponding pixels have different values caused by the motion.

The optical flow metric is based on understanding that corresponding pixels of consecutive images define optical flow that is better aligned with nature of dense correspondence than classification. Hence, the optical flow metric can be used to train the neural network to produce feature vectors that can be used to reconstruct ground truth optical flow.

These metrics can be more effective for different modalities. For example, embedding loss metric is more advantageous for depth images formed by measuring time-of-flight of light, while optical flow metric is better for optical images formed by the refraction or reflection of light. However, in contrast to classification-based training, these metrics can produce similar motion based results for different image modalities, complements each other, and applicable to dense correspondence estimation from multi-modal images. Moreover, such motion based metrics allow to train the neural network on different modalities of digital images to provide, at the best of our knowledge, first multi-modal dense correspondence imaging system.

For example, one embodiment discloses an multi-modal image processing system that includes an input interface configured to accept a consecutive digital images of a motion sequence, wherein the digital images are multi-modal images including a sequence of depth images and a corresponding sequence of color images and a memory configured to store a neural network including a first sub-network trained to extract depth feature vectors from depth pixels and a second subnetwork trained to extract color feature vectors from color pixels.

The first subnetwork is jointly trained with the second subnetwork. For example, the neural network is trained using the sequence of consecutive digital images to output feature vectors for pixels of each digital image that reduce one or combination of a distance between feature vectors of pixels of the same point in each pair of consecutive digital images and an error in an optical flow reconstructed from feature vectors of pixels of each pair of consecutive digital images.

The multi-modal image processing system further includes a processor configured to (1) submit each pair of consecutive multi-modal images to the neural network to produce depth and color feature vectors for each pixel of each of the multi-modal image in the pair; (2) combine depth and color feature vectors of corresponding pixels of each of the multi-modal image in the pair to produce combined feature vectors for each pixel of each of the multi-modal image in the pair; and (3) compare the combined feature vectors of different multi-modal images in the pair to estimate a dense correspondence between pixels of the different multi-modal images in the pair; and to output the dense correspondence between pixels of the multi-modal images in the pair via an output interface.

In effect, the multi-modal image processing system that uses multiple subnetworks jointly trained on images of different modalities increases the accuracy of dense correspondence estimation.

Accordingly, one embodiment discloses a multi-modal dense correspondence image processing system, including an input interface configured to accept a motion sequence of multi-modal images, each multi-modal image includes an image of a first modality and a corresponding image of a second modality different from the first modality, wherein corresponding images of different modalities are images of the same scene; a memory configured to store a neural network including a first subnetwork trained to extract first features from pixels of the first modality, a second subnetwork trained to extract second features from pixels of the second modality, and a combiner configured to combine the first features and the second features to produce multi-modal features of a multi-modal image; a processor configured to submit the multi-modal images to the neural network to produce multi-modal features for each pixel of each of the multi-modal image; and compare the multi-modal features of a pair multi-modal images to estimate a dense correspondence between pixels of the multi-modal images of the pair; and an output interface configured to output the dense correspondence between pixels of the multi-modal images in the pair.

Another embodiment discloses a method for multi-modal dense correspondence reconstruction, wherein the method uses a processor coupled with stored instructions implementing the method, wherein the instructions, when executed by the processor carry out steps of the method. The method includes accepting a motion sequence of multi-modal images, each multi-modal image includes an image of a first modality and a corresponding image of a second modality different from the first modality, wherein corresponding images of different modalities are images of the same scene; submitting the multi-modal images to a neural network to produce multi-modal features for each pixel of each of the multi-modal image, wherein a neural network includes a first subnetwork trained to extract first features from pixels of the first modality, a second subnetwork trained to extract second features from pixels of the second modality, and a combiner configured to combine the first features and the second features to produce multi-modal features of a multi-modal image; comparing the multi-modal features of a pair multi-modal images to estimate a dense correspondence between pixels of the multi-modal images of the pair; and outputting the dense correspondence between pixels of the multi-modal images in the pair.

Yet another embodiment discloses a non-transitory computer readable storage medium embodied thereon a program executable by a processor for performing a method. The method includes accepting a motion sequence of multi-modal images, each multi-modal image includes an image of a first modality and a corresponding image of a second modality different from the first modality; submitting the multi-modal images to a neural network to produce multi-modal features for each pixel of each of the multi-modal image, wherein a neural network includes a first subnetwork trained to extract first features from pixels of the first modality, a second subnetwork trained to extract second features from pixels of the second modality, and a combiner configured to combine the first features and the second features to produce multi-modal features of a multi-modal image; comparing the multi-modal features of a pair multi-modal images to estimate a dense correspondence between pixels of the multi-modal images of the pair; and outputting the dense correspondence between pixels of the multi-modal images in the pair.

DETAILED DESCRIPTION

Figure 1:
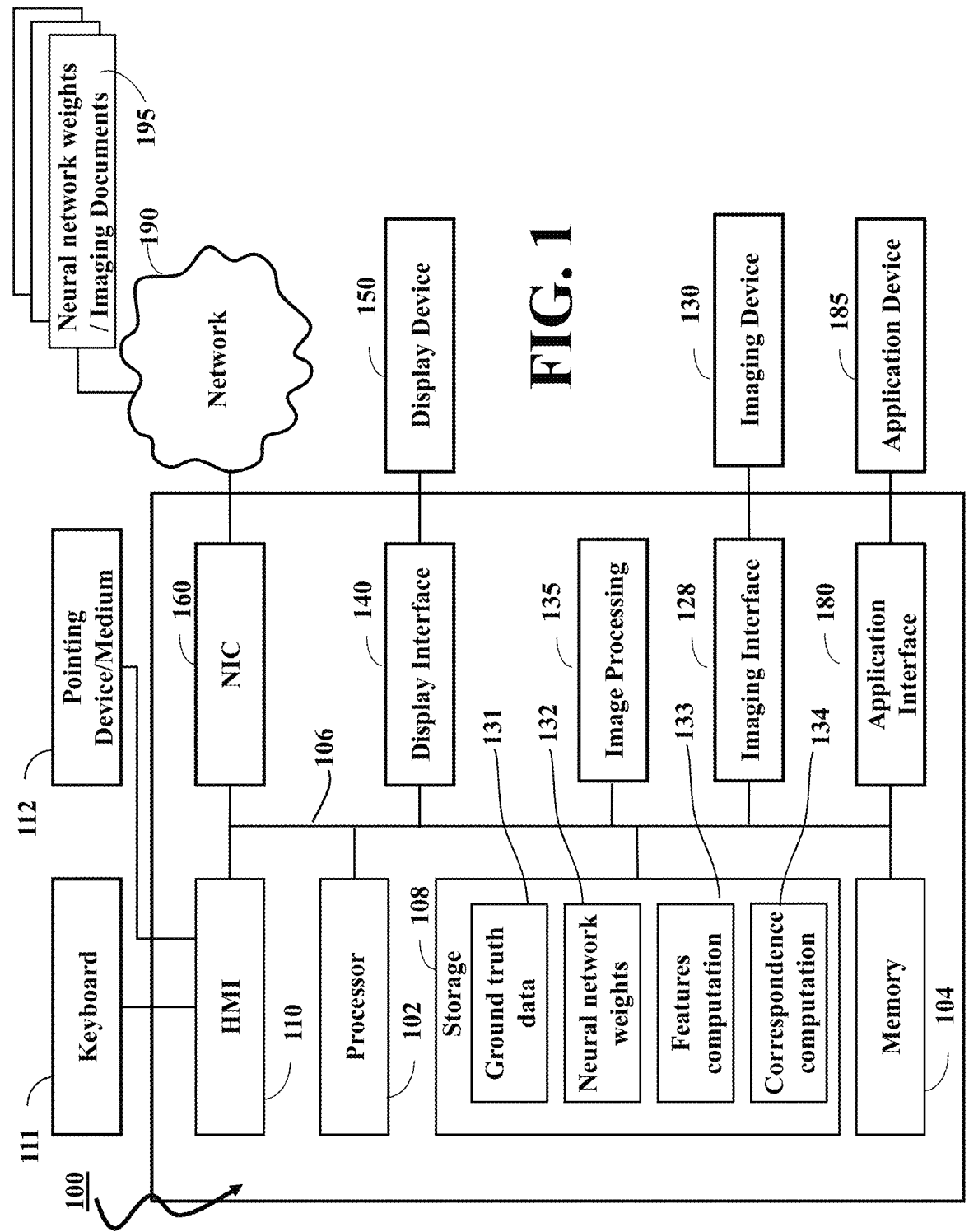
FIG. 1 shows a block diagram of an image processing system 100 for computing multi-modal dense correspondence according to some embodiments.

FIG. 1 shows a block diagram of an image processing system 100 for computing multi-modal dense correspondence according to some embodiments. The image processing system 100 is configured to produce feature vectors, or features for short, of multi-modal images to determine dense correspondences between multi-modal images of a human walking sequence in accordance with some embodiments. The image processing system 100 includes a processor 102 configured to execute stored instructions, as well as a memory 104 that stores instructions that are executable by the processor. The processor 102 can be a single core processor, a multi-core processor, a computing cluster, or any number of other configurations. The memory 104 can include random access memory (RAM), read only memory (ROM), flash memory, or any other suitable memory systems. The processor 102 is connected through a bus 106 to one or more input and output devices.

These instructions implement a method for computing per-pixel features for multi-modal images. The features are computed in a manner such that for pixels in a pair of multi-modal images belonging to the same part of a human body, the features are similar. In other words, the distance between those features from the different multi-modal images is small according to some metric. For example, in one embodiment the multi-modal images are a depth image and a color (RGB) image.

The image processing system 100 is configured to perform feature computation and correspondence computation between a pair of multi-modal images. The image processing system 100 can include a storage device 108 adapted to store ground truth data 131 used for training, the neural network weights 132, a feature computation 133 and a correspondence computation 134. The storage device 108 can be implemented using a hard drive, an optical drive, a thumbdrive, an array of drives, or any combinations thereof. Different implementations of the image processing system 100 may have different combination of the modules 131-134. For example, one embodiment uses the neural network 132 trained in advance. In this embodiment, the ground truth data 131 may be absent.

A human machine interface 110 within the image processing system 100 can connect the system to a keyboard 111 and pointing device 112, wherein the pointing device 112 can include a mouse, trackball, touchpad, joy stick, pointing stick, stylus, or touchscreen, among others. The image processing system 100 can be linked through the bus 106 to a display interface 140 adapted to connect the image processing system 100 to a display device 150, wherein the display device 150 can include a computer monitor, camera, television, projector, or mobile device, among others.

The image processing system 100 can also be connected to an imaging interface 128 adapted to connect the system to an imaging device 130 which provides multi-modal images. In one embodiment, the images for dense correspondence computation are received from the imaging device. The imaging device 130 can include a RGBD camera, depth camera, thermal camera, RGB camera, computer, scanner, mobile device, webcam, or any combination thereof.

A network interface controller 160 is adapted to connect the image processing system 100 through the bus 106 to a network 190. Through the network 190, the images 195 including one or combination of the features and imaging input documents and neural network weights can be downloaded and stored within the computer's storage system 108 for storage and/or further processing.

In some embodiments, the image processing system 100 is connected to an application interface 180 through the bus 106 adapted to connect the image processing system 100 to an application device 185 that can operate based on results of image comparison. For example, the device 185 is a system which uses the dense correspondences to reconstruct radar images of moving people to provide high throughput access security. The image processing system 100 can also be connected with other image processing applications 135.

Figure 2:
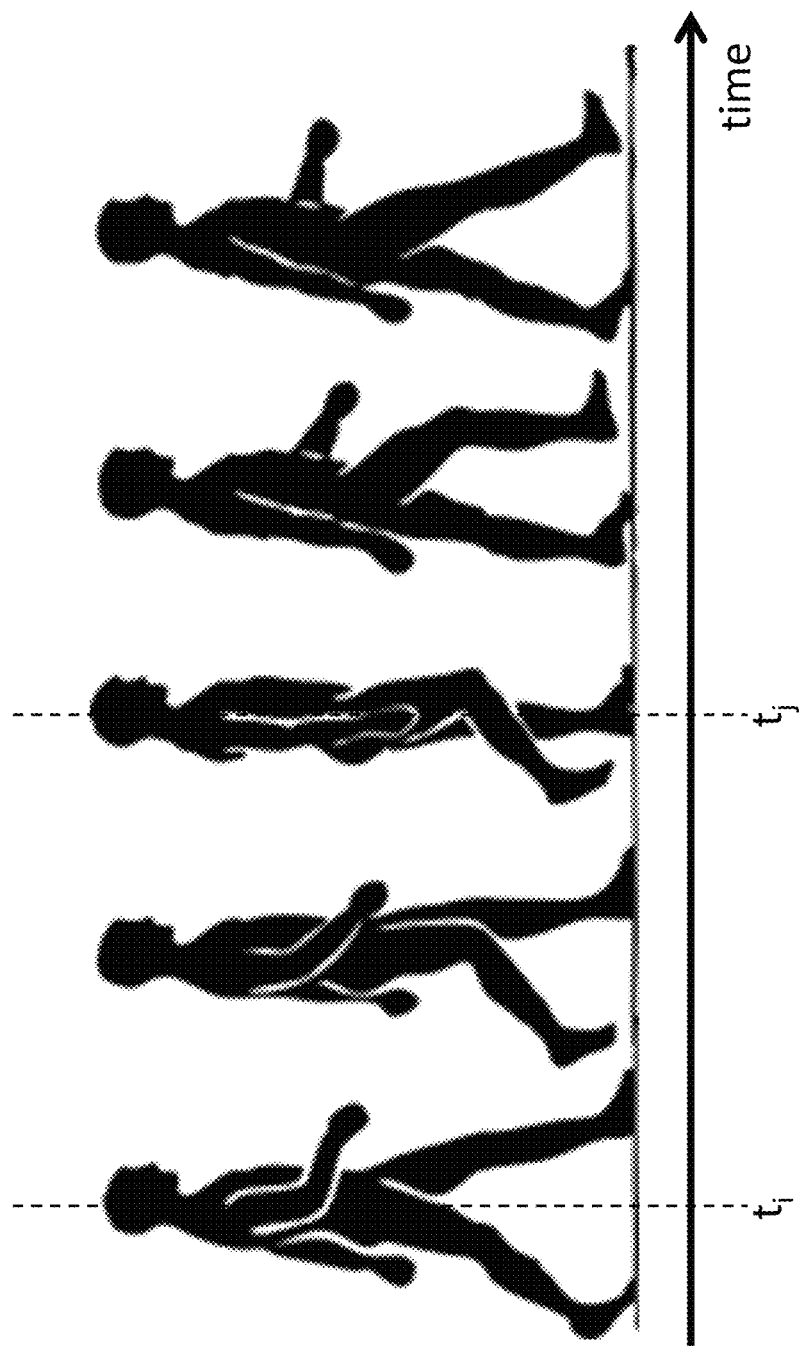
FIG. 2 shows an example of a human walking motion sequence used by some embodiments.

FIG. 2 shows an example of a human walking motion sequence used by some embodiments. Although the motion is continuous, at discrete time steps multi-modal images are acquired. For example, at time steps $t_i$ and $t_j$. In some embodiments, the image processing system 100 is configured to accept a motion sequence of multi-modal images, such as each multi-modal image includes an image of a first modality and a corresponding image of a second modality different from the first modality. In some implementations, the motion sequence includes a sequence of consecutive digital multi-modal images. In alternative implementations, the motion sequence includes a sequence of multi-modal images are images within in temporal threshold in a sequence of consecutive digital multi-modal images. However, in this implementation, all images do not have to be consecutive in time.

Figure 3A:
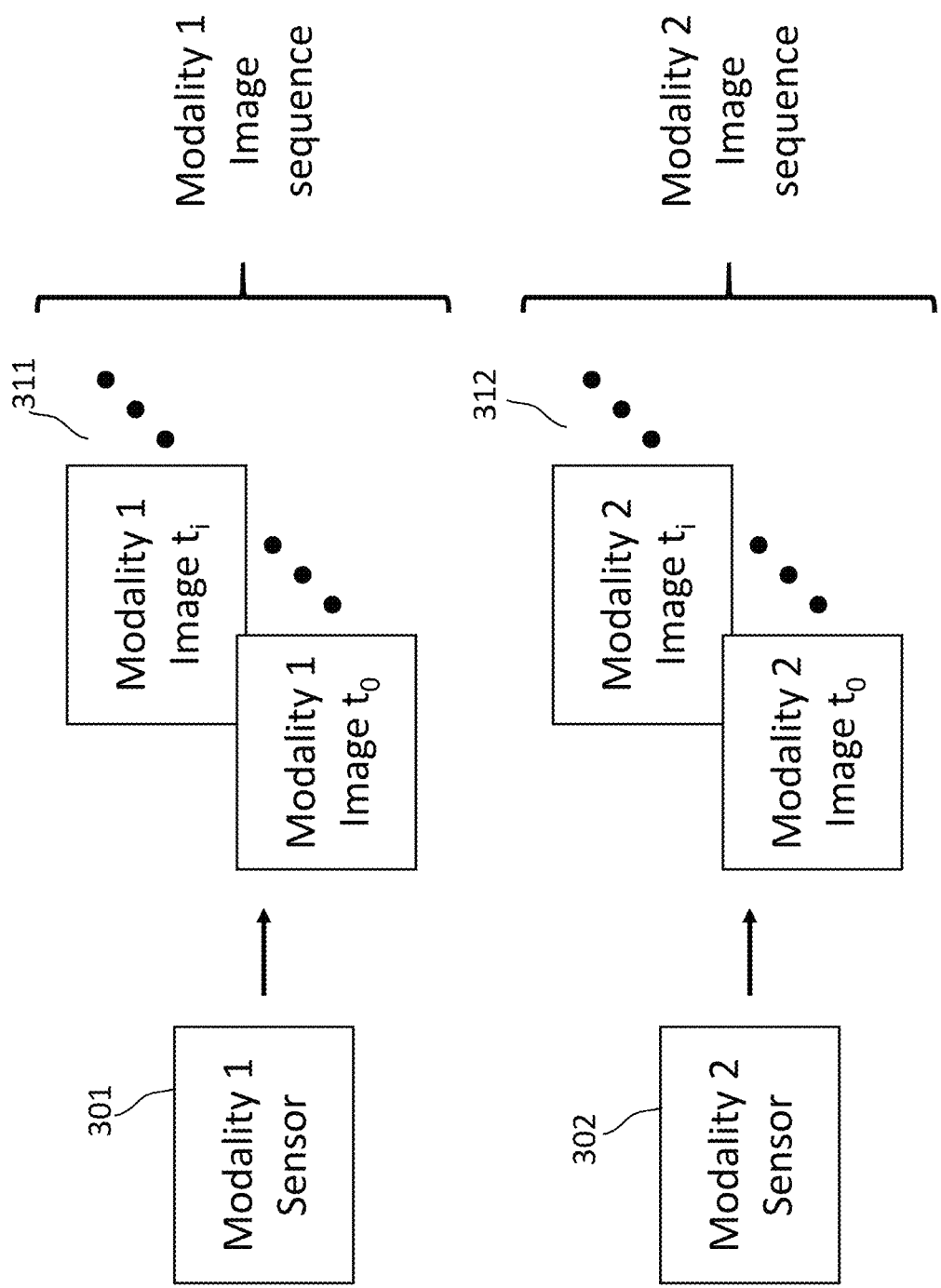
FIG. 3A shows a schematic of two sensors of different modalities producing sequences of images according to some embodiments.

FIG. 3A shows a schematic of two sensors of different modalities producing sequences of images according to some embodiments. A sequence of images includes multiple images each taken at some time step. For clarity we depict each modality as an individual sensor. A first modality uses a modality 1 sensor 301, to acquire a multi-modal image sequence 311. A second modality uses a modality 2 sensor 302, to acquire a multi-modal image sequence 312. It is understood that the two modalities can also be acquired by a single sensor, and then separated into image sequences 311 and 312.

Figure 3B:
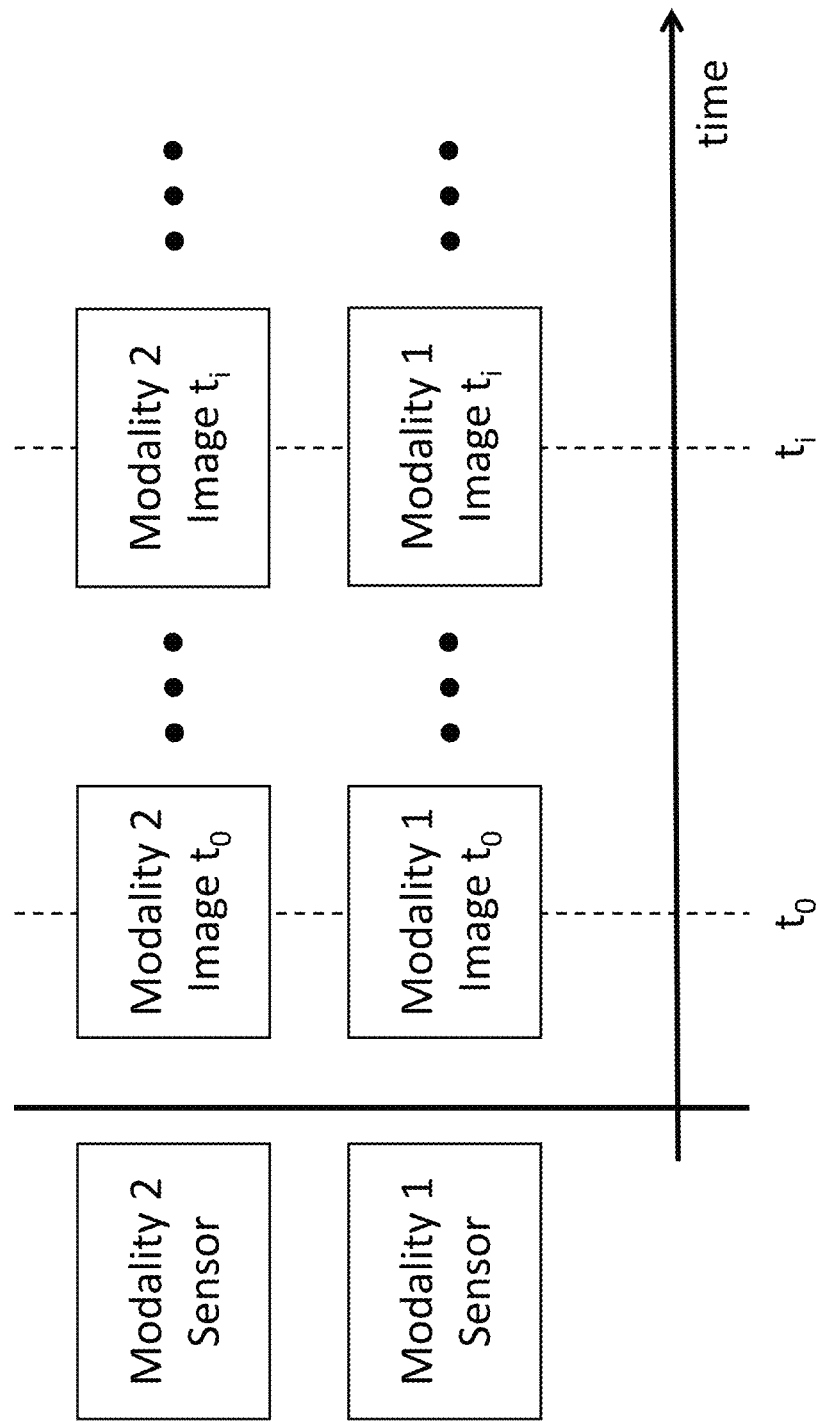
FIG. 3B shows a schematic depicting that at each time step, each of the modality sensors produces an image simultaneously and/or concurrently according to some embodiments.

FIG. 3B shows a schematic depicting that at each time step, each of the modality sensors produces an image simultaneously and/or concurrently according to some embodiments. In such a manner, the corresponding images of different modalities are images of the same scene. The content of each modality image therefore represents the human subject at a point of time with minimal temporal differences between the modality images. The time step of to represents the point in time where the acquisition of the sensor(s) is started. It has no significant meaning otherwise. An example of multiple modalities is color (RGB) and depth. Other modalities may be infrared (including thermal), estimated skeletal pose, multi-spectral.

For example, in some embodiments, the first modality is selected from a depth modality such that the image of the first modality is formed based on a time-of-flight of light, and wherein the second modality is selected from an optical modality such that the image of the second modality is formed by refraction or reflection of light. Additionally, or alternatively, in some embodiments, the image of the optical modality is one or combination of a radiography image, an ultrasound image, a nuclear image, a computed tomography image, a magnetic resonance image, an infrared image, a thermal image, and a visible light image.

Additionally, or alternatively, in some embodiments, a modality of an image is defined by a type of a sensor acquiring an image, such as the image of the first modality is acquired by a sensor of different type than a sensor that acquired the image of the second modality. Additionally, or alternatively, in some embodiments, the images of the first modality are depth images, and the images of the second modality are color images.

Figure 4A:
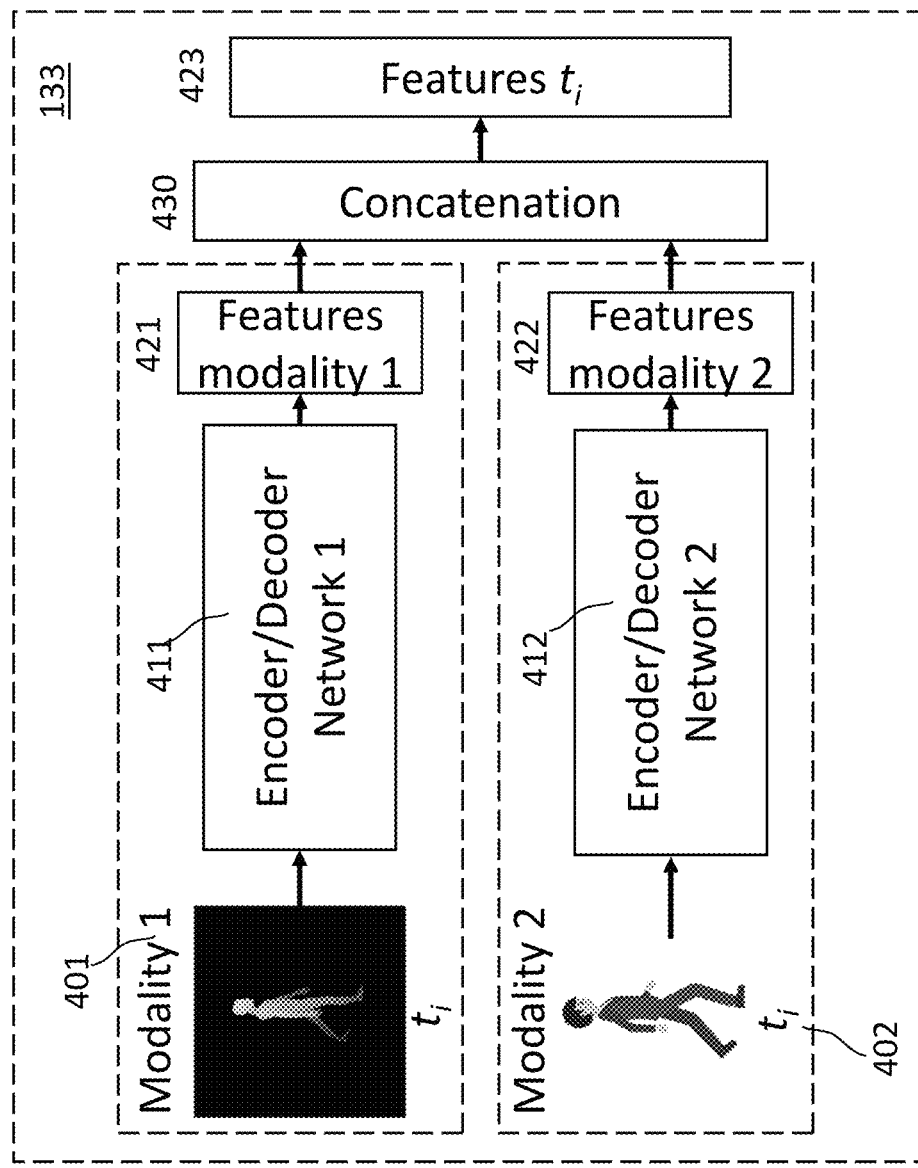
FIG. 4A and FIG. 4B show the computation of multi-modal features at different time steps according to some embodiments.

FIG. 4A shows the computation of features using neural (sub-) networks for multiple modality images and concatenation to multi-modal features at a time step $t_i$ according to some embodiments. In various embodiments, the multi-modal dense correspondence image processing system 100 is configured to submit the multi-modal images to a neural network to produce multi-modal features for each pixel of each of the multi-modal image, wherein a neural network includes a first subnetwork trained to extract first features from pixels of the first modality, a second subnetwork trained to extract second features from pixels of the second modality, and a combiner configured to combine the first features and the second features to produce multi-modal features of a multi-modal image.

In such a manner, the neural network is trained to produce multi-modal features suitable to improve accuracy of dense correspondence. To that end, the multi-modal dense correspondence image processing system 100 is configured to compare the multi-modal features of a pair of multi-modal images to estimate a dense correspondence between pixels of the multi-modal images of the pair and output the dense correspondence between pixels of the multi-modal images in the pair.

The features computation 133 includes several components. A first modality image 401 at time step $t_i$ is input to a neural network 411. The neural network 411 computes a feature vector, or simply features, 421. A second modality image 402 at the same time step $t_i$ is input to a neural network 412. The neural network 412 computes feature, 422. A concatenation module 430 combines the features 421 and 422 to multi-modal features 423 at time step $t_i$, by concatenation of the feature vectors.

Figure 4B:
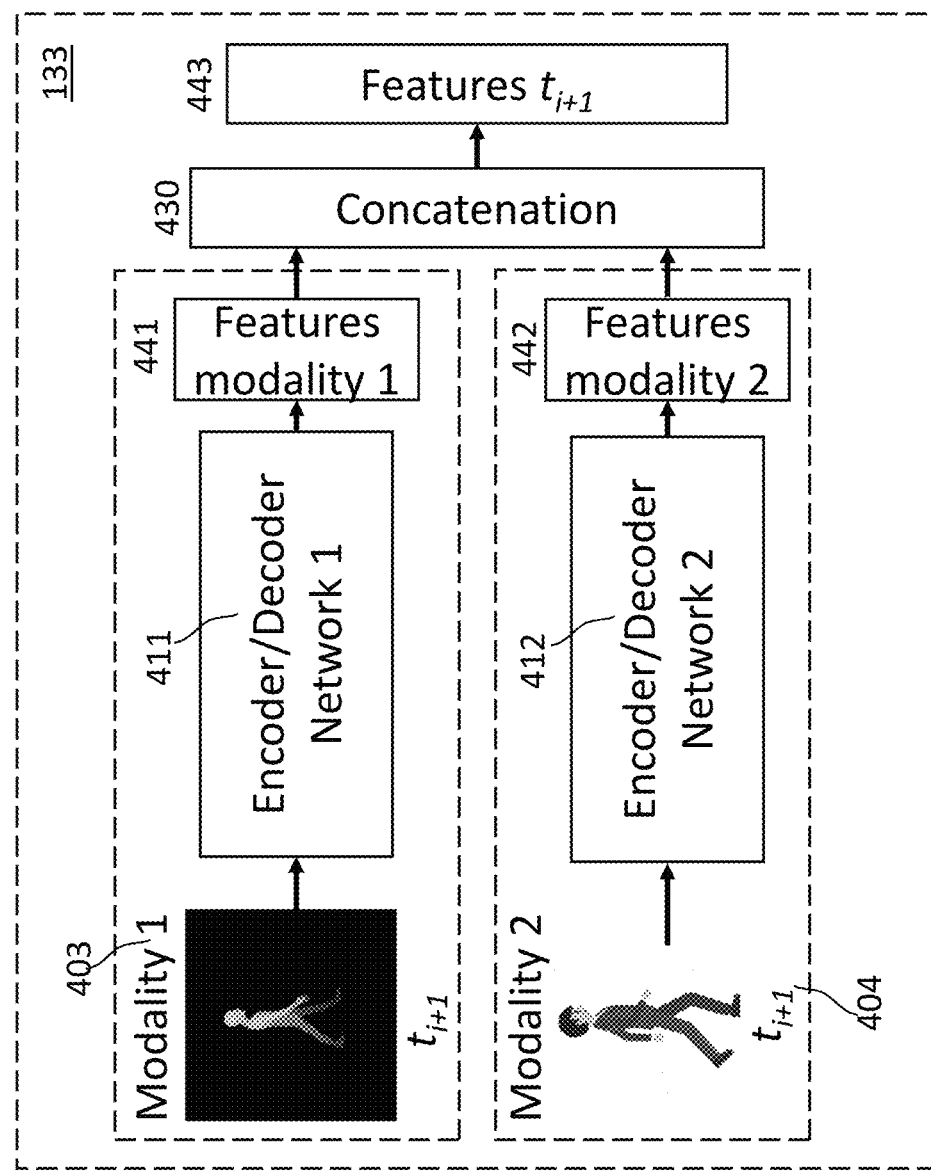

FIG. 4B shows the computation of features using neural (sub-) networks for multiple modality images and concatenation to multi-modal features at a time step $t_{i+1}$ according to some embodiments. The features computation 133 includes several components. A first modality image 403 at time step $t_{i+1}$ is input to a neural network 411. The neural network 411 produces a feature vector, or simply features, 441. A second modality image 404 at the same time step $t_{i+1}$ is input to a neural network 412. The neural network 412 produces feature, 442. A concatenation module 430 combines the features 441 and 442 to multi-modal features 443 at time step $t_{i+1}$, by concatenation of the feature vectors.

It is to be understood that different image content for a first modality image 401, for example modality image 403, will result in different features 421, for example features 441. Similarly, different image content for a second modality image 402, for example modality image 404, will result in different features 422, for example features 442.

Figure 5:
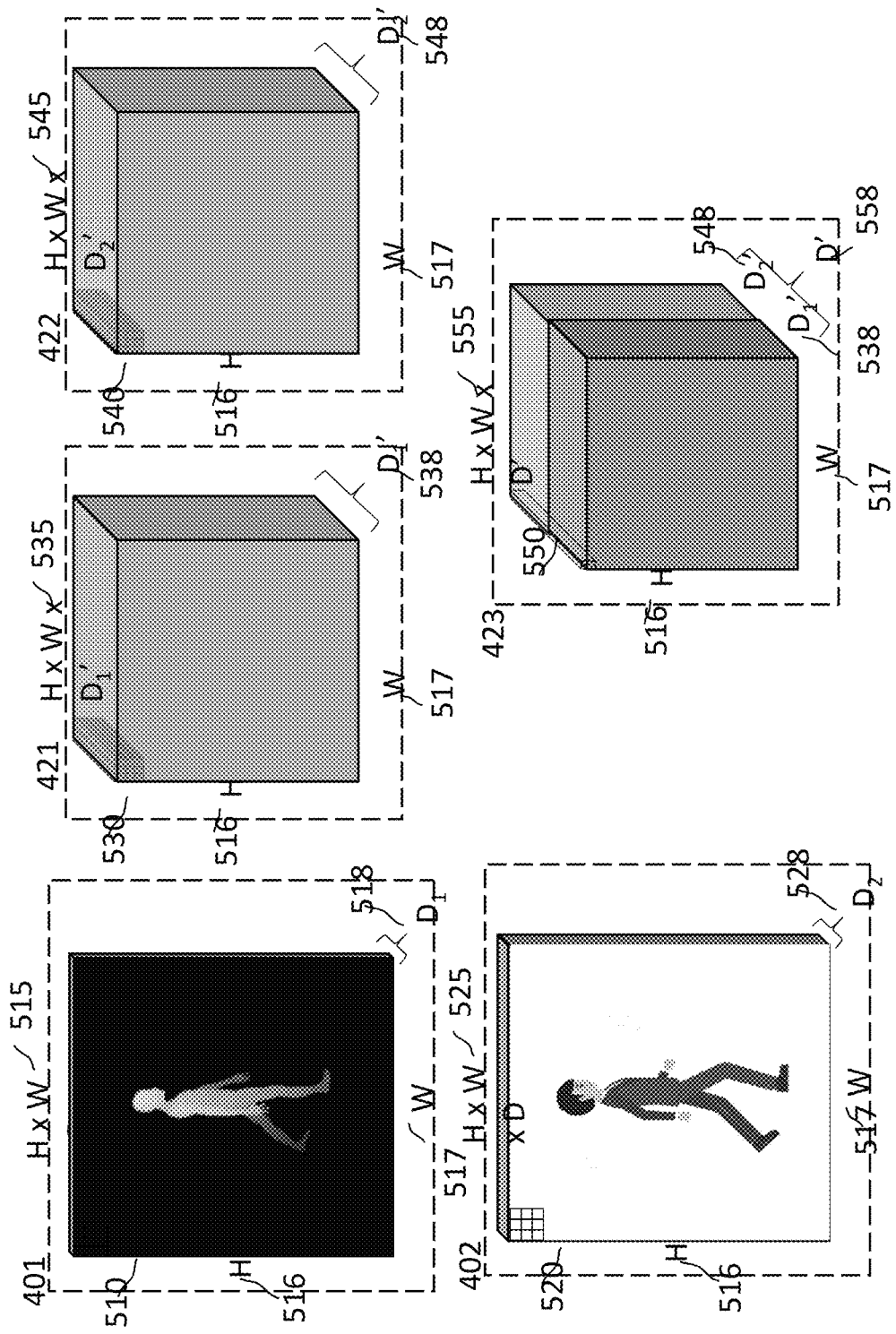
FIG. 5 shows a schematic of computation of the per-pixel features from the multi-modal input images and the concatenation of each modality per-pixel features according to some embodiments.

FIG. 5 shows a schematic of computation of the per-pixel features from the multi-modal input images and the concatenation of each modality per-pixel features according to some embodiments. FIG. 5 shows the computation of the features 423 at a time step $t_i$. Similar procedure is performed for computing the features 443 at a time step $t_{i+1}$.

The input image of a first modality 401 includes an array of pixels 510. For clarity only a small subset of pixels 510 is shown in modality image 401. The input image of a first modality 401 has a resolution 515, of height (H) 516 by width (W) 517 by modality channel depth ($D_1$) 518. The input image of a second modality 402 includes an array of pixels 520. For clarity only a small subset of pixels 520 is shown in modality image 402. The input image of a second modality 402 has a resolution 525, of height (H) 516 by width (W) 517 by modality channel depth ($D_2$) 528.

The features 421 of a first modality are determined from an array of pixels 530. For clarity only a small subset of pixels 530 for features 421 are shown. Features 421 have a resolution 535 of height (H) 516 by width (W) 517 by feature channel depth ($D'_1$) 538. The features 422 of a second modality are determined from an array of pixels 540. For clarity only a small subset of pixels 540 for features 422 are shown. Features 422 have a resolution 545 of height (H) 516 by width (W) 517 by feature channel depth ($D'_2$) 548.

The multi-modal features 423 are determined from an array of pixels 550. For clarity only a single pixel 550 is shown in multi-modal features 423. The multi-modal features 423 have a resolution 555 of height (H) 516 by width (W) 517 by feature channel depth (D') 558. The multi-modal features 423 are formed by concatenation 430 of features 421 and features 422. The multi-modal features 423 channel depth D' 558 is thus the sum of channel depths 538 ($D'_1$) and 548 ($D'_2$): $D'=D'_1+D'_2$. Since the H and W for features 421, 422 and 423 are the same as the H and W for input 401 and 402, this disclosure labels them as per-pixel features with channel depths $D'_1$, $D'_2$, D' respectively.

Figure 6:
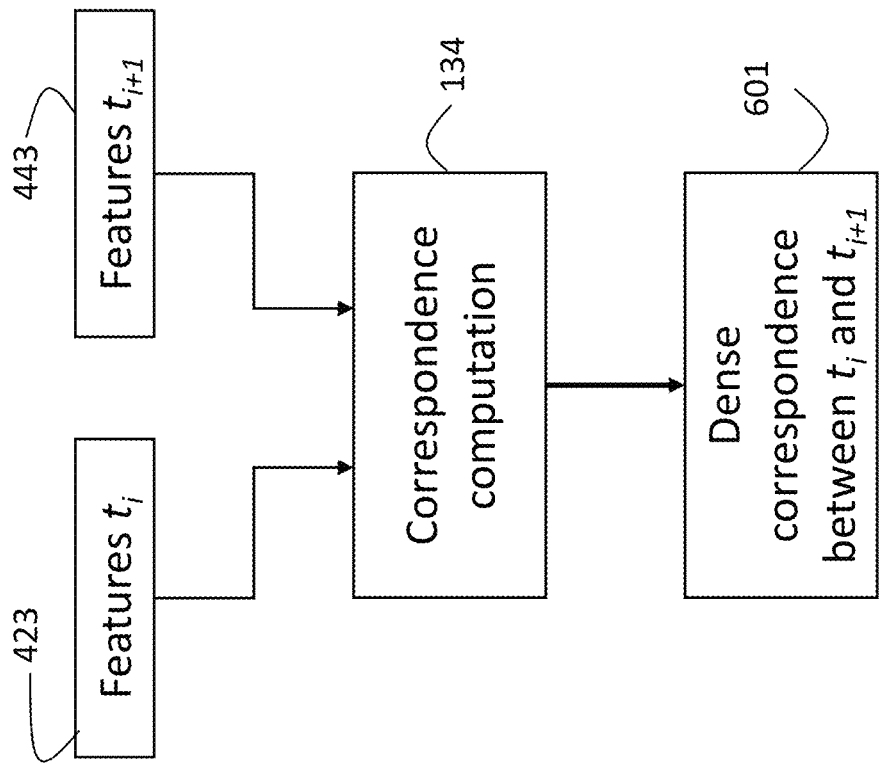
FIG. 6 shows a flow chart of a method for computation of dense correspondences between multi-modal input images at two different time steps according to some embodiments.

FIG. 6 shows a flow chart of a method for computation of dense correspondences between multi-modal input images at two different time steps according to some embodiments. The multi-modal features 423 determined at a time step $t_i$ and the multi-modal features 443 determined at a time step $t_{i+1}$ are input to a correspondence computation 134. In one embodiment the correspondence computation 134 iterates over the pixels of features 423, labeled iteration1. For each pixel in iteration1, a second iteration iterates over the pixels of multi-modal features 443, labeled iteration2. The feature for the pixel under consideration in iteration1, and the feature for the pixel under consideration in iteration2 are compared to determine similarity. The feature for the pixel in iteration2 that is most similar to the feature for the pixel in iteration1 is assigned as the correspondence. The similarity is computed as the L2 distance between the features. The dense correspondences 601 are output at the end of iteration1.

In such a manner, the system 100 is configured to compare the multi-modal features of different pixels with a nested iterations comparison. The nested iteration comparison iterates first through multi-modal features of a first multi-modal image in the pair and for each combine features of the first multi-modal image of a current pixel in the first iteration iterates second through multi-modal features of a second multi-modal image in the pair to establish a correspondence between the current pixel in the first multi-modal image and a pixel in the second multi-modal image having the multi-modal features closest to the multi-modal features of the current pixel.

Additionally or alternatively, some embodiments solve an optimization problem minimizing a difference between the multi-modal features of all pixels of a first multi-modal image in the pair and permutation of the multi-modal features of all pixels of a second multi-modal image in the pair, such that the permutation defines the correspondent pixels in the pair multi-modal images. For example, on embodiment poses the correspondence computation 134 as an optimization problem:

$$\underset{W,M}{\arg\min} \|F_1 - MF_2\|_2^2 + \lambda WM$$

The per-pixel multi-modal features 423 are stacked into a matrix $F_1$ and the per-pixel multi-modal features 443 are stacked into a matrix $F_2$. The matrix M is a permutation matrix. The matrix W can impose constraints on matrix M during optimization. The dense correspondences 601 are then determined by the permutation matrix M after the optimization has finished.

Training

Figure 7:
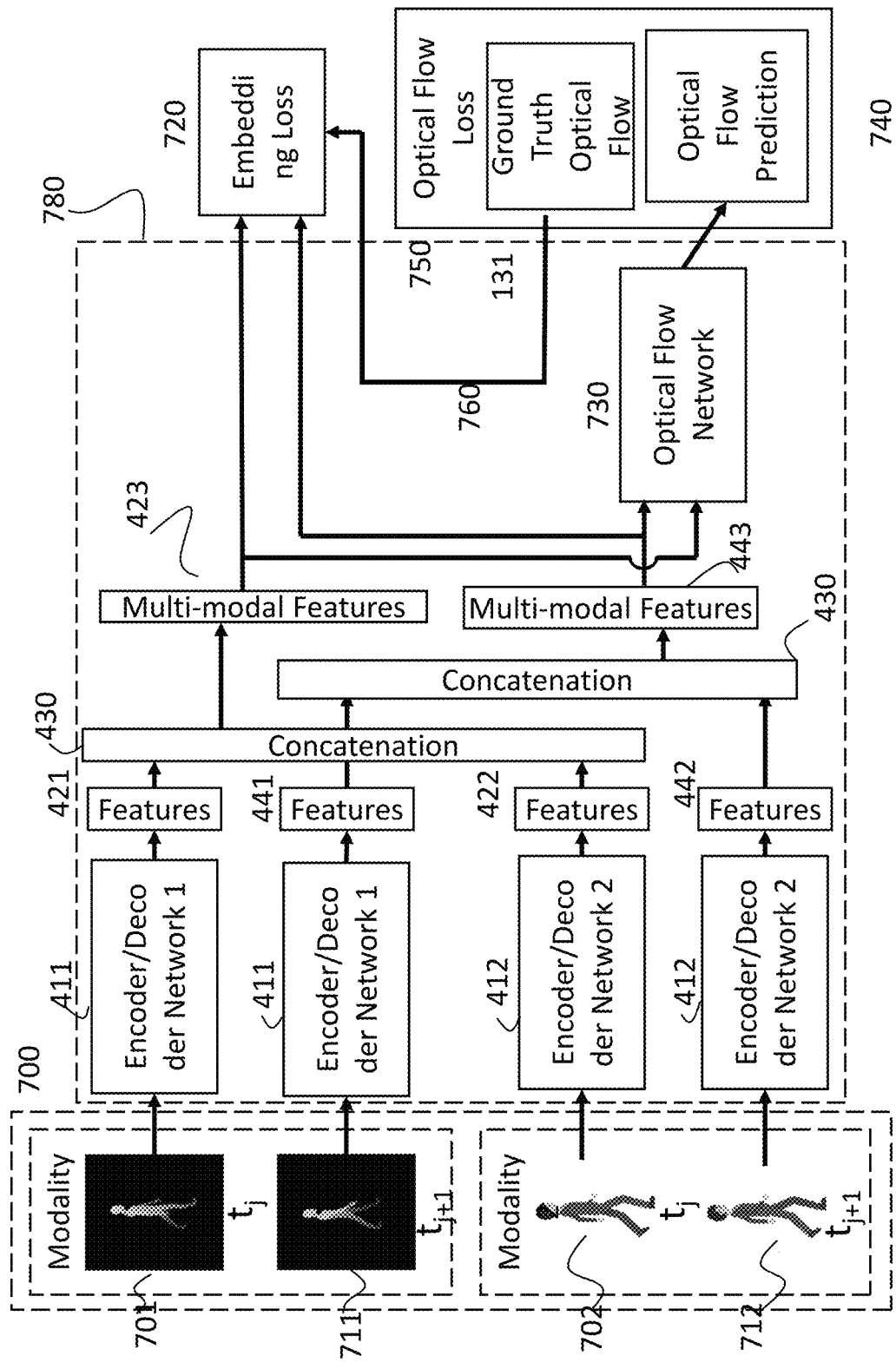
FIG. 7 shows a schematic of joint training of subnetworks of the neural network according to some embodiments.

FIG. 7 shows a schematic of joint training of subnetworks of the neural network according to some embodiments. The subnetworks of a neural network 780 are trained jointly to produce the multi-modal features 423 and/or 443 for the multi-modality inputs images. The neural network 780 includes several neural subnetworks forming neural network weights 132. Training the neural network 780 takes different pairs of multi-modal input images. For example, a pair of multi-modal input images includes a first multi-modal input image of input modality image 701 and input modality image 702, and a second multi-modal input image of input modality image 711 and input modality image 712.

As described previously feature computation 133 uses the subnetworks 411 and 412 along with concatenation 430 to produce multi-modal features 423 and 443 of each multi-modal image. The multi-modal features 423 and 443 are input to the embedding loss 720, and also to another optical flow neural network 730. The optical flow network 730 produces an optical flow prediction 740. The embedding prediction is compared with the ground truth data 131 to determine an embedding loss. The optical flow prediction is compared with the ground truth optical flow 131 to determine an optical flow loss.

A loss is the error computed by a function. In one embodiment, the function for the embedding loss 720 is defined as:

$$\sum_{i=1}^{N} y_i \|D_1(p_i) - D_2(p'_i)\|_2^2 + (1 - y_i)\max(0, C - \|D_1(p_i) - D_2(p'_i)\|_2^2) \quad (1)$$

$$\text{Where: } \begin{cases} y_i = 1 & \text{if } p_i \Leftrightarrow p'_i \\ y_i = 0 & \text{otherwise} \end{cases} \quad (2)$$

The functions $D_1(\ )$ and $D_2(\ )$ in equation (1) above represent the steps to produce the multi-modal features 423 and 443 respectively. For a given pixel $p_i$ the corresponding feature from features 423 is denoted as $D_1(p_i)$. For a given pixel $p'_i$ the corresponding feature from features 443 is denoted as $D_2(p'_i)$. If the pixels are in correspondence ($p_i \Leftrightarrow p'_i$ and thus $y_i=1$ in equation (2)), the loss in equation (1) is computed according to the left-hand side with respect to the '+' sign. If the pixels are not in correspondence ($y_i=0$ in equation (2)), the loss in equation (1) is computed according to the right-hand side with respect to the '+' sign. In colloquial terms the loss function specified with equation (1) tries to achieve similar features for pixels in correspondence, and dissimilar features for pixels that are not in correspondence.

Training randomly selects a number P pixels from the multi-modal input images 701 and 702, and determine the corresponding pixels in 711 and 712 using the ground truth optical flow data 131 for training. Training further selects a number Q of non-correspondences. The correspondences and non-correspondences sum to N=P+Q. The selection of pixels is providing the data 760 for computing the embedding loss 720.

Figures 8A, 8B:
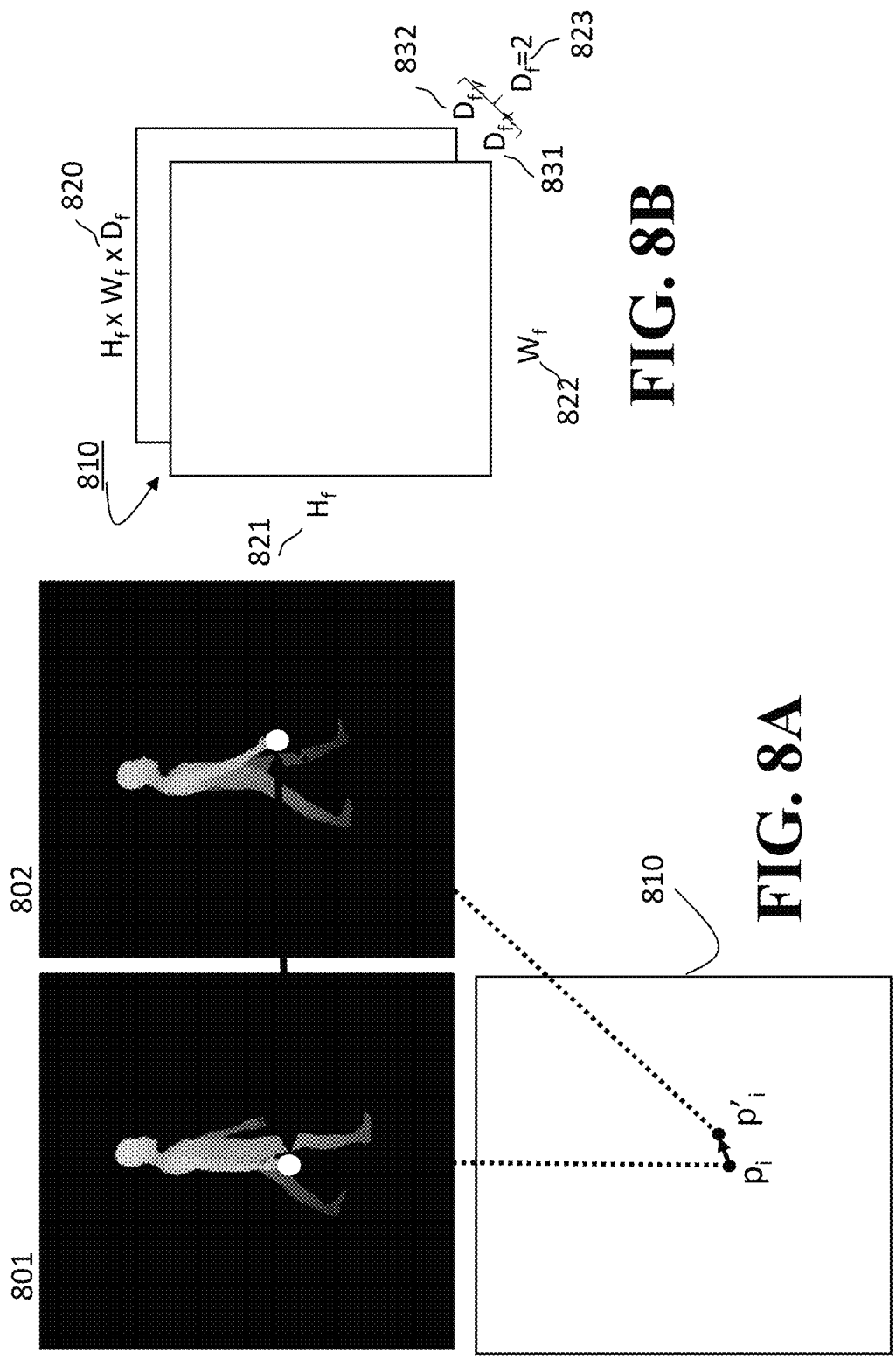
FIG. 8A shows a schematic of an optical flow vector for two corresponding pixels estimated according to some embodiments.
FIG. 8B shows an exemplar optical flow image according to some embodiments.

FIG. 8A shows a schematic of an optical flow vector for two corresponding pixels estimated according to some embodiments. A pixel $p_i$ in one image 801 is in correspondence with a pixel $p'_i$ in an another image 802. The optical flow vector is the direction in which the pixel $p_i$ moves to $p'_i$ within the image. Optical flow vectors are stored in an optical flow image 810. An optical flow vector is stored for each pixel in optical flow image 810.

FIG. 8B shows an exemplar optical flow image according to some embodiments. The optical flow image 810 has a resolution of height ($H_f$) 821 by width ($W_f$) 822 by channel depth ($D_f$) 823. The channel depth 823 is two, $D_f=2$. Each channel of the optical flow image 810 stores one component of the flow vectors. The first channel $D_{f,x}$ 831 stores the x-component, which corresponds to changes in the horizontal direction. The second channel $D_{f,y}$ 832 stores the y-components, which corresponds to changes in the vertical direction.

In some embodiments, the optical flow loss 750 is computed as the difference between the flow values at the pixels of the predicted optical flow image and the pixels of the ground truth optical flow image.

Figure 9:
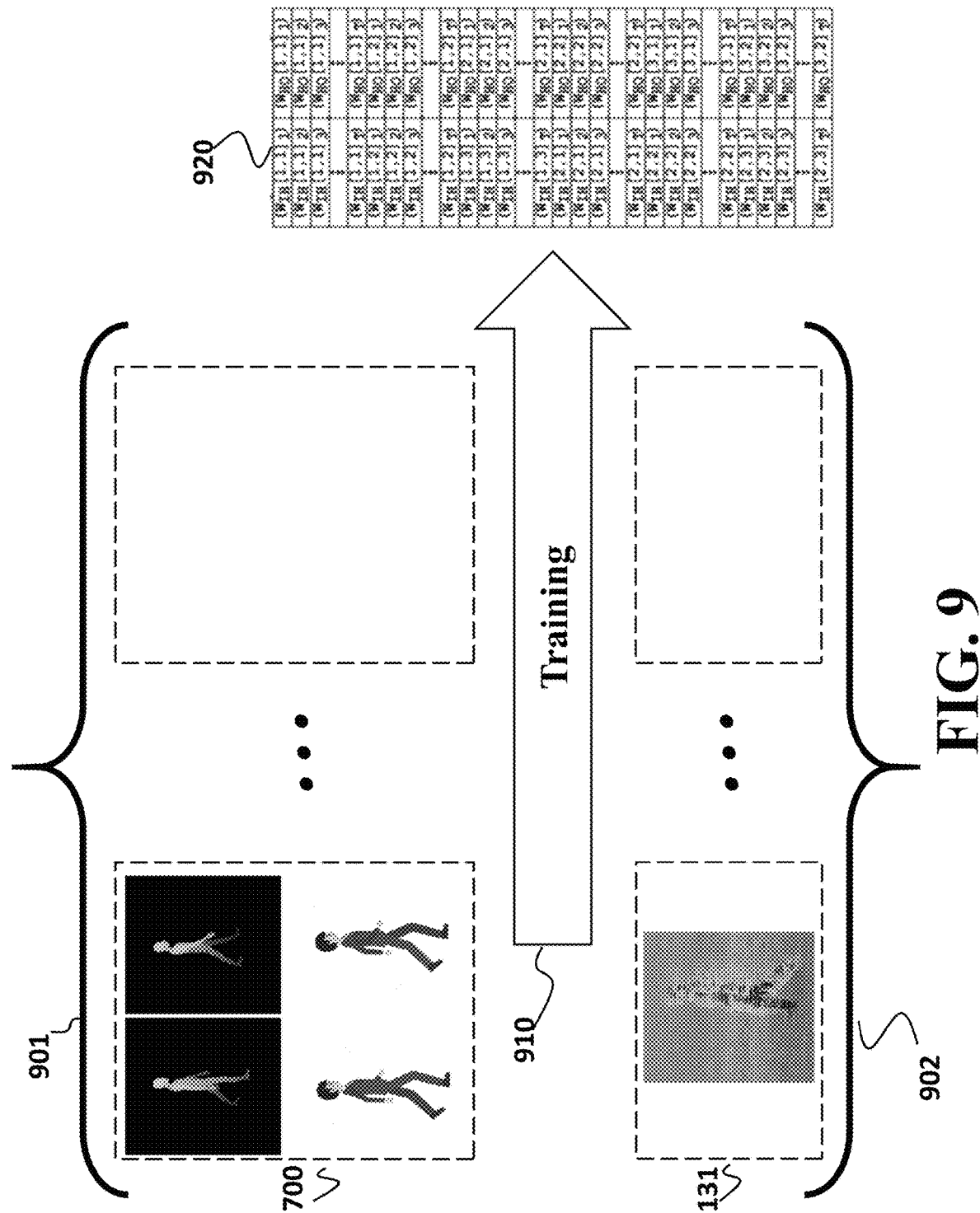
FIG. 9 shows a schematic of the training used by some embodiments.

FIG. 9 shows a schematic of the training used by some embodiments. The training 910 uses a training set 901 of multi-modal image pairs 700 and corresponding set 902 of ground-truth optical flow images to produce the weights 920 of the neural network 780. In general, training an artificial-neural-network comprises applying a training algorithm, sometimes referred to as a "learning" algorithm, to an artificial-neural-network in view of a training set. A training set may include one or more sets of inputs and one or more sets of outputs with each set of inputs corresponding to a set of outputs. A set of outputs in a training set comprises a set of outputs that are desired for the artificial-neural-network to generate when the corresponding set of inputs is inputted to the artificial-neural-network and the artificial-neural-network is then operated in a feed-forward manner.

Training the neural network involves computing the weight values associated with the connections in the artificial-neural-network. To that end, unless herein stated otherwise, the training includes electronically computing weight values for the connections in the fully connected network, the interpolation and the convolution. The embedding loss 720 and optical flow loss 750 are summed together and a stochastic gradient descent based method is used to update the neural network weights. Training continues until some desired performance threshold is reached.

Figure 10:
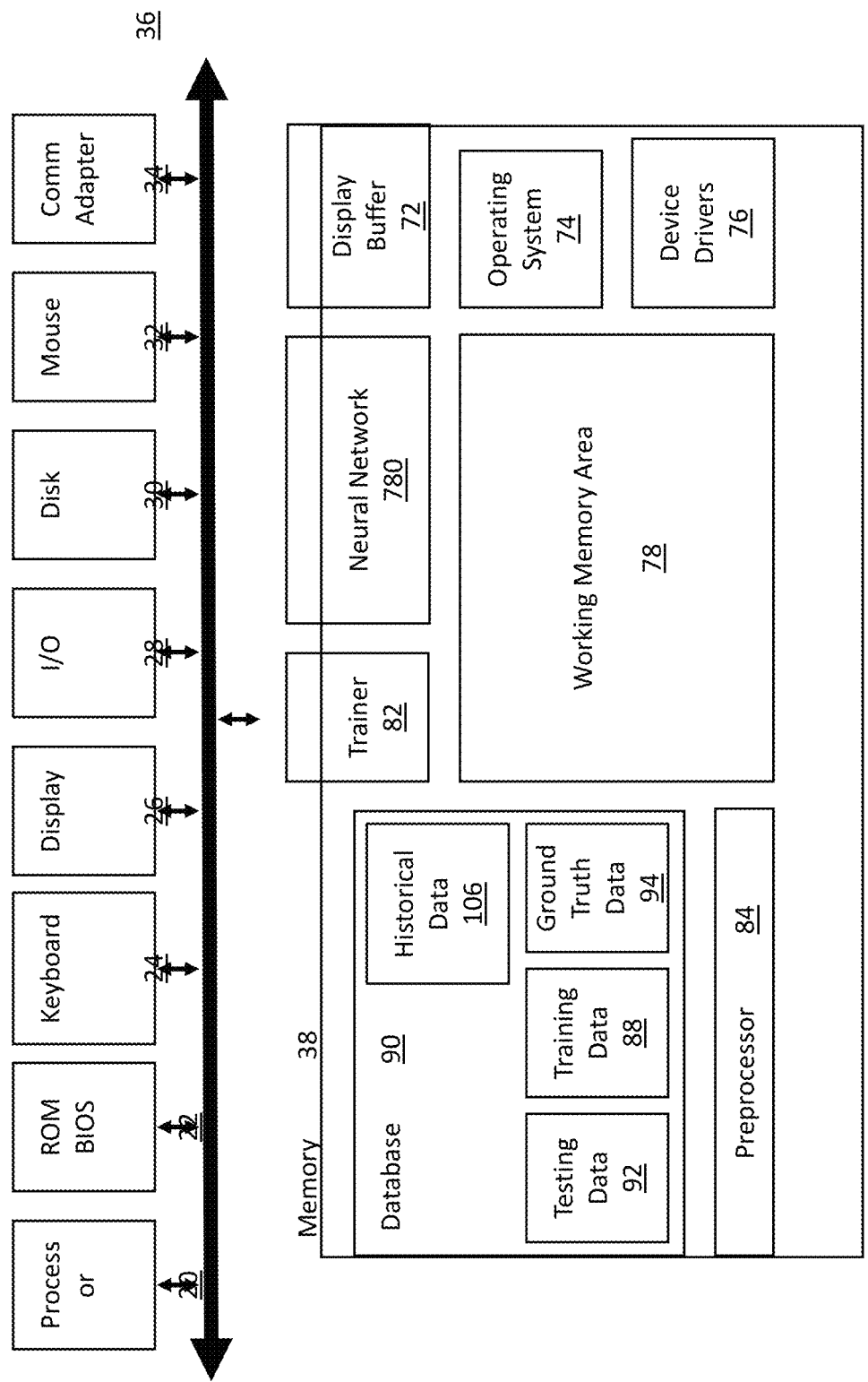
FIG. 10 shows a block diagram of a training system according to one embodiment.

FIG. 10 shows a block diagram of a training system according to one embodiment. The training system includes a processor 20 connected by a bus 36 to a read only memory (ROM) 22 and a memory 38. The training system can also include a display 26 to present information to the user, and a plurality of input devices including a keyboard 24, mouse 32 and other devices that may be attached via input/output port 28. Other input devices such as other pointing devices or voice sensors or image sensors can also be attached. Other pointing devices include tablets, numeric keypads, touch screen, touch screen overlays, track balls, joy sticks, light pens, thumb wheels etc. The I/O 28 can be connected to communications lines, disk storage 30, input devices, output devices or other I/O equipment. The memory 38 includes a display buffer 72 that contains pixel intensity values for a display screen. The display 26 periodically reads the pixel values from the display buffer 72 displaying these values onto a display screen. The pixel intensity values may represent grey-levels or colors.

The memory 38 includes a database 90, trainer 82, the neural network 780, preprocessor 84. The database 90 can include historical data 106, training data 88, testing data 92 and ground truth data 94. The database may also include results from operational, training or retaining modes of using the neural network 780. These elements have been described in detail above.

Also shown in memory 38 is the operating system 74. Examples of operating systems include AIX, OS/2, and DOS. Other elements shown in memory 38 include device drivers 76 which interpret the electrical signals generated by devices such as the keyboard and mouse. A working memory area 78 is also shown in memory 38. The working memory area 78 can be utilized by any of the elements shown in memory 38. The working memory area can be utilized by the neural network 780, trainer 82, the operating system 74 and other functions. The working memory area 78 may be partitioned amongst the elements and within an element. The working memory area 78 may be utilized for communication, buffering, temporary storage, or storage of data while a program is running.

Figure 11:
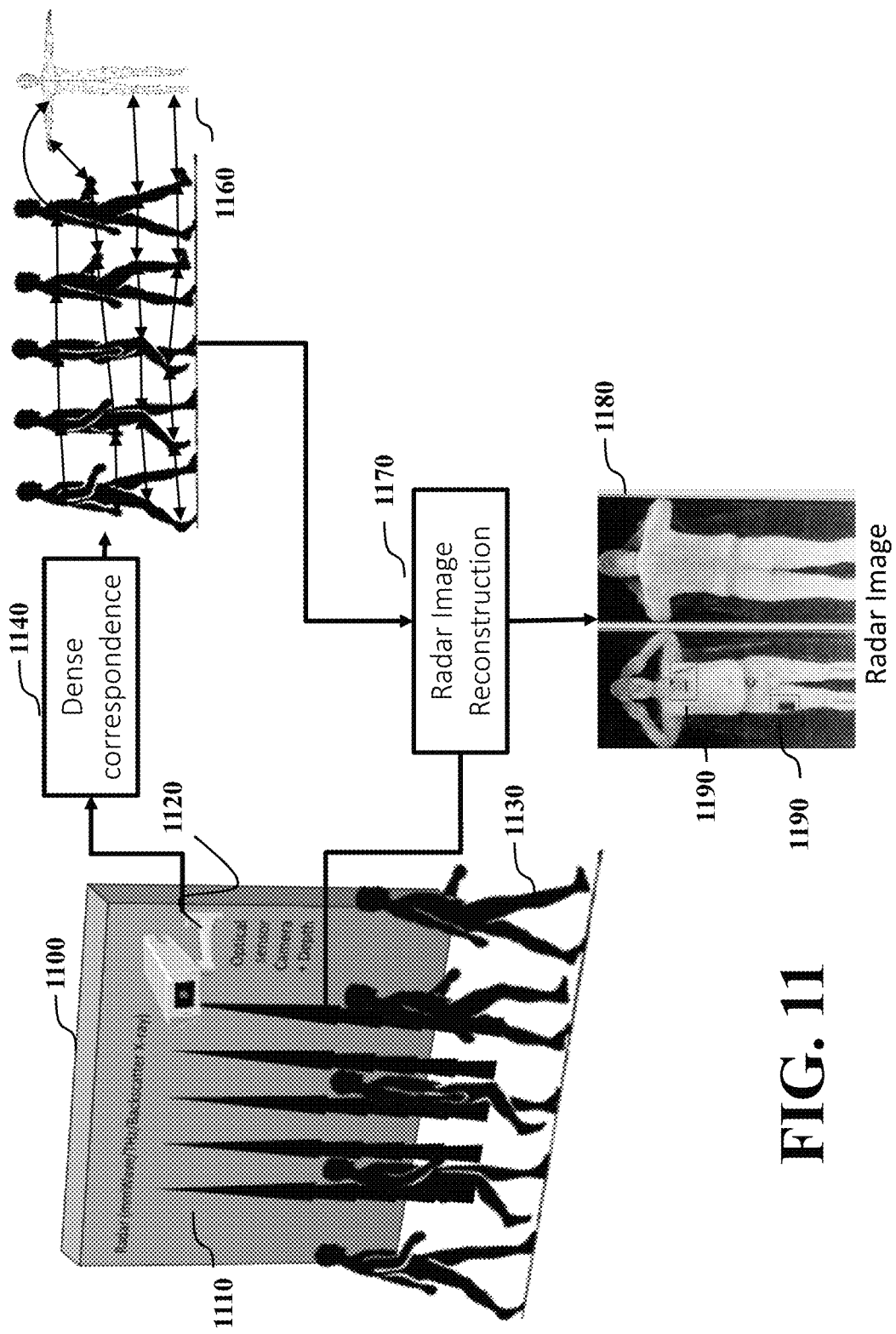
FIG. 11 shows a schematic of reconstruction of a radar reflectivity image according to one embodiment.

FIG. 11 shows a schematic of reconstruction of a radar reflectivity image according to one embodiment. In this embodiment a radar imaging system is configured to reconstruct a radar reflectivity image of a moving object using the dense correspondence determined for the motion sequence of multi-modal images. In this embodiment, the radar imaging system includes one or more electromagnetic sensors, such as radar arrays 1110, and one or more optical sensors 1120. The object 1130, for example a human, moves and deforms in front of the radar and the optical sensors, while the sensors acquire snapshots. The data acquired by the optical sensor are processed by a dense correspondence system 1140, which produces a tracking of the object and its deformation from snapshot to snapshot. The dense correspondence system 1140 also provides a mapping of the deformation to the object's prototypical pose. This mapping is used together with the data acquired in each radar snapshot to reconstruct 1170 the radar reflectivity image of the object 1180. The reconstructed radar reflectivity image may be represented in the prototypical pose by the system, may be converted and represented in any pose and with any modifications suitable to the system or its user, for example to highlight parts of the image for further examination 1190.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A multi-modal dense correspondence image processing system, comprising:
   an input interface configured to accept a motion sequence of multi-modal images, each multi-modal image includes an image of a first modality and a corresponding image of a second modality different from the first modality, wherein corresponding images of different modalities are images of the same scene;
   a memory configured to store a neural network including a first subnetwork trained to extract first features from pixels of the first modality, a second subnetwork trained to extract second features from pixels of the second modality, and a combiner configured to combine the first features and the second features to produce multi-modal features of a multi-modal image;
   a processor configured to submit the multi-modal images to the neural network to produce the multi-modal features for each pixel of each of the multi-modal images, wherein each of the multi-modal images is submitted separately to the neural network to produce its multi-modal features thereby executing the neural network multiple times but once for each of the multi-modal images; and to estimate a dense correspondence between pixels of the multi-modal images by computing distances between multi-modal features of a pair of multi-modal images; and
   an output interface configured to output the dense correspondence between pixels of the multi-modal images in the pair.

2. The system of claim 1, wherein the first subnetwork is jointly trained with the second subnetwork to reduce an error between the multi-modal features of the multi-modal images and ground truth data.

3. The system of claim 2, wherein the error includes an embedding loss and an optical flow loss, wherein the embedding loss is a distance between multi-modal features produced by the neural network for corresponding pixels of the same point in a pair of different multi-modal images, wherein an optical flow loss is an error in an optical flow reconstructed from the multi-modal features produced by the neural network for corresponding pixels of the same point in the pair of different multi-modal images.

4. The system of claim 1, wherein the neural network is jointly trained with an embedding loss subnetwork trained to reduce a distance between multi-modal features produced by the neural network for corresponding pixels of the same point in a training pair of different multi-modal images and is jointly trained with an optical flow subnetwork trained to reduce an error in an optical flow reconstructed by the optical flow subnetwork from the multi-modal features of pixels in the training pair of different multi-modal images.

5. The system of claim 1, wherein the processor is configured to estimate the dense correspondence by comparing computed distances between the multi-modal features of different pixels in the pair of multi-modal images to find a correspondence between pixels with the smallest distance between their multi-modal features.

6. The system of claim 5, wherein the processor is configured to compare the multi-modal features of different pixels with nested iterations, wherein the nested iteration iterates first through multi-modal features of a first multi-modal image in the pair and for each current pixel of the first multi-modal image in the first iteration, iterates second through multi-modal features of a second multi-modal image in the pair to establish a correspondence between the current pixel in the first multi-modal image and a pixel in the second multi-modal image having the multi-modal features closest to the multi-modal features of the current pixel.

7. The system of claim 5, wherein the processor solves an optimization problem minimizing a difference between the multi-modal features of all pixels of a first multi-modal image in the pair and permutation of the multi-modal features of all pixels of a second multi-modal image in the pair, such that the permutation defines the correspondent pixels in the pair multi-modal images.

8. The system of claim 1, wherein the first modality is selected from a depth modality such that the image of the first modality is formed based on a time-of-flight of light, and wherein the second modality is selected from an optical modality such that the image of the second modality is formed by refraction or reflection of light.

9. The system of claim 8, wherein the image of the optical modality is one or combination of a radiography image, an ultrasound image, a nuclear image, a computed tomography image, a magnetic resonance image, an infrared image, a thermal image, and a visible light image.

10. The system of claim 1, wherein a modality of an image is defined by a type of a sensor acquiring an image, such as the image of the first modality is acquired by a sensor of different type than a sensor that acquired the image of the second modality.

11. The system of claim 1, wherein the images of the first modality are depth images, and wherein the images of the second modality are color images.

12. The system of claim 1, wherein the motion sequence includes a sequence of consecutive digital multi-modal images.

13. The system of claim 1, wherein the motion sequence includes a sequence of multi-modal images, which are images within a temporal threshold in a sequence of consecutive digital multi-modal images.

14. A radar imaging system configured to reconstruct a radar reflectivity image of a moving object from the motion sequence of multi-modal images using the dense correspondence determined by the system of claim 1.

15. A method for multi-modal dense correspondence reconstruction, wherein the method uses a processor coupled with stored instructions implementing the method, wherein the instructions, when executed by the processor carry out steps of the method, comprising: accepting a motion sequence of multi-modal images, each multi-modal image includes an image of a first modality and a corresponding image of a second modality different from the first modality, wherein corresponding images of different modalities are images of the same scene; submitting the multi-modal images to a neural network to produce multi-modal features for each pixel of each of the multi-modal image, wherein a neural network includes a first subnetwork trained to extract first features from pixels of the first modality, a second subnetwork trained to extract second features from pixels of the second modality, and a combiner configured to combine the first features and the second features to produce multi-modal features of a multi-modal image, and wherein each of the multi-modal images is submitted separately to the neural network to produce its multi-modal features thereby executing the neural network multiple times but once for each of the multi-modal images; estimating a dense correspondence between pixels of the multi-modal images of the pair by comparing the multi-modal features of a pair of multi-modal images; and outputting the dense correspondence between pixels of the multi-modal images in the pair.

16. The method of claim 15, wherein the first subnetwork is jointly trained with the second subnetwork to reduce an error between the multi-modal features of the multi-modal images and ground truth data, wherein the error includes an embedding loss and an optical flow loss, wherein the embedding loss is a distance between multi-modal features produced by the neural network for corresponding pixels of the same point in a pair of different multi-modal images, wherein an optical flow loss is an error in an optical flow reconstructed from the multi-modal features produced by the neural network for corresponding pixels of the same point in the pair of different multi-modal images.

17. The method of claim 15, wherein the first modality is selected from a depth modality such that the image of the first modality is formed based on a time-of-flight of light, and wherein the second modality is selected from an optical modality such that the image of the second modality is formed by refraction or reflection of light.

18. A non-transitory computer-readable storage medium embodied thereon a program executable by a processor for performing a method, the method comprising: accepting a motion sequence of multi-modal images, each multi-modal image includes an image of a first modality and a corresponding image of a second modality different from the first modality; submitting the multi-modal images to a neural network to produce multi-modal features for each pixel of each of the multi-modal image, wherein a neural network includes a first subnetwork trained to extract first features from pixels of the first modality, a second subnetwork trained to extract second features from pixels of the second modality, and a combiner configured to combine the first features and the second features to produce multi-modal features of a multi-modal image, and wherein each of the multi-modal images is submitted separately to the neural network to produce its multi-modal features thereby executing the neural network multiple times but once for each of the multi-modal images; estimating a dense correspondence between pixels of the multi-modal images of the pair by comparing the multi-modal features of a pair of multi-modal images; and outputting the dense correspondence between pixels of the multi-modal images in the pair.

* * * * *